United States Patent
Tokinoya

(10) Patent No.: US 9,841,150 B2
(45) Date of Patent: Dec. 12, 2017

(54) WAVELENGTH CONVERSION SHEET AND BACKLIGHT UNIT

(71) Applicant: TOPPAN PRINTING CO., LTD., Tokyo (JP)

(72) Inventor: Osamu Tokinoya, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 15/066,729

(22) Filed: Mar. 10, 2016

(65) Prior Publication Data

US 2016/0195229 A1 Jul. 7, 2016

Related U.S. Application Data

(63) Continuation of application No. PCT/JP2014/074333, filed on Sep. 12, 2014.

(30) Foreign Application Priority Data

Sep. 13, 2013 (JP) .................................. 2013-190236

(51) Int. Cl.

| | |
|---|---|
| *F21V 9/16* | (2006.01) |
| *F21K 2/00* | (2006.01) |
| *F21V 7/04* | (2006.01) |
| *F21K 99/00* | (2016.01) |
| *B32B 27/36* | (2006.01) |

(Continued)

(52) U.S. Cl.
CPC ............... *F21K 9/56* (2013.01); *B32B 27/08* (2013.01); *B32B 27/18* (2013.01); *B32B 27/36* (2013.01); *F21V 9/16* (2013.01); *G02B 6/0073* (2013.01); *G02F 1/133603* (2013.01); *B32B 2255/10* (2013.01); *B32B 2255/20* (2013.01); *B32B 2255/205* (2013.01); *B32B 2255/26* (2013.01); *B32B 2255/28* (2013.01); *B32B 2457/00* (2013.01); *G02F 2001/133614* (2013.01)

(58) Field of Classification Search
USPC ........................................... 362/84, 34, 606
See application file for complete search history.

(56) References Cited

U.S. PATENT DOCUMENTS

2005/0029513 A1* 2/2005 Kawashima .......... C23C 14/024
257/40
2006/0268537 A1 11/2006 Kurihara et al.
(Continued)

FOREIGN PATENT DOCUMENTS

JP 2004-303562 A 10/2004
JP 2009-018568 A 1/2009
(Continued)

OTHER PUBLICATIONS

International Search Report issued in International Application No. PCT/JP2014/074333, dated Nov. 11, 2014.
(Continued)

*Primary Examiner* — Daniel Hess
(74) *Attorney, Agent, or Firm* — Foley & Lardner LLP

(57) ABSTRACT

The present invention is a wavelength conversion sheet, including a lamination of a phosphor layer using quantum dots, and a barrier film, with the barrier film being obtained by laminating a barrier layer on one surface of a polyethylene terephthalate film having an acid number smaller than about 25 inclusive.

14 Claims, 7 Drawing Sheets

(51) Int. Cl.
*B32B 27/08* (2006.01)
*B32B 27/18* (2006.01)
*G02F 1/1335* (2006.01)
*F21V 8/00* (2006.01)

(56) References Cited

U.S. PATENT DOCUMENTS

2014/0022819 A1* 1/2014 Oh .................... G02B 6/005
362/607
2016/0025920 A1   1/2016 Oh et al.

FOREIGN PATENT DOCUMENTS

| JP | 2009-255040 A | 11/2009 |
| JP | 2011-013567 A | 1/2011 |
| JP | 2012-086394 A | 5/2012 |
| JP | 2013-069726 A | 4/2013 |
| TW | 201241536 A1 | 10/2012 |

OTHER PUBLICATIONS

Extended European Search Report dated Apr. 25, 2017 in corresponding European Patent Application No. 14844756.8.
Office Action dated Jun. 16, 2017 in Chinese Patent Application No. 201480050317.4.

* cited by examiner

WAVELENGTH CONVERSION SHEET AND BACKLIGHT UNIT

CROSS-REFERENCE TO RELATED PATENT APPLICATIONS

This application is a continuation application filed under 35 U.S.C. §111(a) claiming the benefit under 35 U.S.C. §§120 and 365(c) of PCT International Application No. PCT/JP2014/074333 filed on Sep. 12, 2014, which is based upon and claims the benefit of priority of Japanese Application No. 2013-190236, filed on Sep. 13, 2013, the entire contents of them all are hereby incorporated by reference.

TECHNICAL FIELD

The present invention relates to a wavelength conversion sheet that uses phosphors composed of quantum dots, and also relates to a backlight unit, and more specifically relates to a wavelength conversion sheet including a barrier film in which a ceramic thin film layer is formed on at least one surface of a plastic film, and correspondingly relates to a backlight unit using the wavelength conversion sheet.

BACKGROUND

Liquid crystal displays use liquid crystal compositions for display. The liquid crystal displays are used as display devices for various machines, in particular, as information display devices and image display devices.

Such a liquid crystal display shows an image by transmitting or blocking light on a region basis, according to voltage application. Accordingly, to show an image on the liquid crystal display, external light is needed. As a light source for the external light, a backlight is provided for use on a back surface of the liquid crystal display. Conventionally, cold cathode tubes are used for such backlights. Recently, there are circumstances where LEDs (light emitting diodes) are used instead of cold cathode tubes, for the reasons of long life, good color development, and the like.

In recent years, nanosized phosphors using quantum dots have been commercialized mainly by venture companies overseas. Quantum dots are luminescent semiconductor nanoparticles and have a diameter in a range of 1 to 20 nm. The unique optical properties and electronic properties of the quantum dots are being utilized in many applications, such as flat panel displays and illumination (decorative lighting) with a wide variety of colors, in addition to fluorescent imaging applications in the fields of biology and medical diagnosis.

White LED technology, which plays a supremely important role in displays, generally uses a method of exciting cerium-doped YAG-Ce (yttrium-aluminum-garnet) phosphors for down conversion, by means of a blue (450 nm) LED chip. When the blue light of the LED becomes admixed with the yellow light generated from the YAG phosphors with a wide wavelength range, white light is created. However, this white light commonly is somewhat bluish and therefore is taken to be a cold white or cool white.

The quantum dots exhibit a wide excitation spectrum and have high quantum efficiency and thus can be used as LED down conversion phosphors. The quantum dots can have an emission wavelength fully adjusted over the entire visible region by only altering the dot size or the type of the semiconductor material. Therefore, the quantum dots can create substantially any color, in particular, warm whites that are strongly desired in the illumination industry. In addition, combinations of three types of dots having emission wavelengths corresponding to red, green, and blue enable white lights having different color rendering indices. Thus, displays provided with a backlight unit using phosphors composed of quantum dots can improve hue and can express up to 65% of the colors that can be distinguished by a person, without increasing the thickness, power consumption, costs, or manufacturing processes more than those of conventional liquid crystal TVs.

Such a backlight unit is configured by combining a wavelength conversion sheet with an LED light source and a light guide plate. The wavelength conversion sheet is obtained by diffusing quantum dots having an emission spectrum of red or green into a film, and sealing a surface thereof, and its edge portions as well in some cases, with a barrier film or a lamination of barrier films. The barrier film is required to have an appearance without wear and tear, wrinkles or the like, and to have transparency, in addition to barrier properties. However, conventional barrier films cannot provide satisfactory performance since they have only been used as packaging materials for foods, medical supplies, and the like, or packaging materials for electronic devices and the like.

Several methods have been conceived in order to solve such problems. For example, PTL 1 proposes a configuration sandwiching a layer having phosphors between barrier films to minimize degradation of the phosphors. In addition, PTL 2 proposes coating a device with a barrier film to ensure reliability of an organic EL device.

With reference to PTLs 1 and 2, a display was prepared by sealing quantum dots with an existing barrier film. However, the obtained white light had a short life due to the insufficient barrier properties, and had unevenness in the white LED light due to wear and tear, and wrinkles in the film, and due to patterns of the quantum dots, and the like.

CITATION LIST

Patent Literature

PTL 1: JP 2011-13567 A
PTL 2: JP 2009-18568 A

SUMMARY OF THE INVENTION

Technical Problem

The present invention has been made in view of the problems set forth above and has an object of providing a wavelength conversion sheet which includes a barrier film with good barrier properties and transparency and can well exhibit the performance of quantum dots, and providing a display backlight unit obtained by using the wavelength conversion sheet.

Solution to Problem

As a means for attempting to improve or even for solving these problems, the present invention provides a wavelength conversion sheet including a lamination of a phosphor layer using quantum dots and a barrier film. In the wavelength conversion sheet, the barrier film is obtained by laminating a barrier layer on one surface of a polyethylene terephthalate film having an acid number smaller than about 25 inclusive.

The barrier layer may include an inorganic oxide thin film layer and a gas barrier coating layer.

The inorganic oxide thin film layer may be composed of a vapor deposited film of silicon oxide or aluminum oxide.

The gas barrier coating layer may contain at least one selected from a group consisting of hydroxyl group-containing polymer compounds, metal alkoxides, metal alkoxide hydrolysates, and metal alkoxide polymeric materials.

The inorganic oxide thin film layers and the gas barrier coating layers may be alternately laminated twice or more on one surface of the polyethylene terephthalate film.

A plastic film may be further adhered onto the barrier film by means of an acrylic resin tackifier.

Advantageous Effects of the Invention

The present invention relates to a wavelength conversion sheet and a backlight, which make use of phosphors composed of quantum dots. According to the present invention, a display of vivid colors closer to natural colors and of good hue is provided by using a barrier film or a laminated film including the barrier film, having good barrier properties and transparency.

DESCRIPTION OF REPRESENTATIVE EMBODIMENTS

Figure 1:
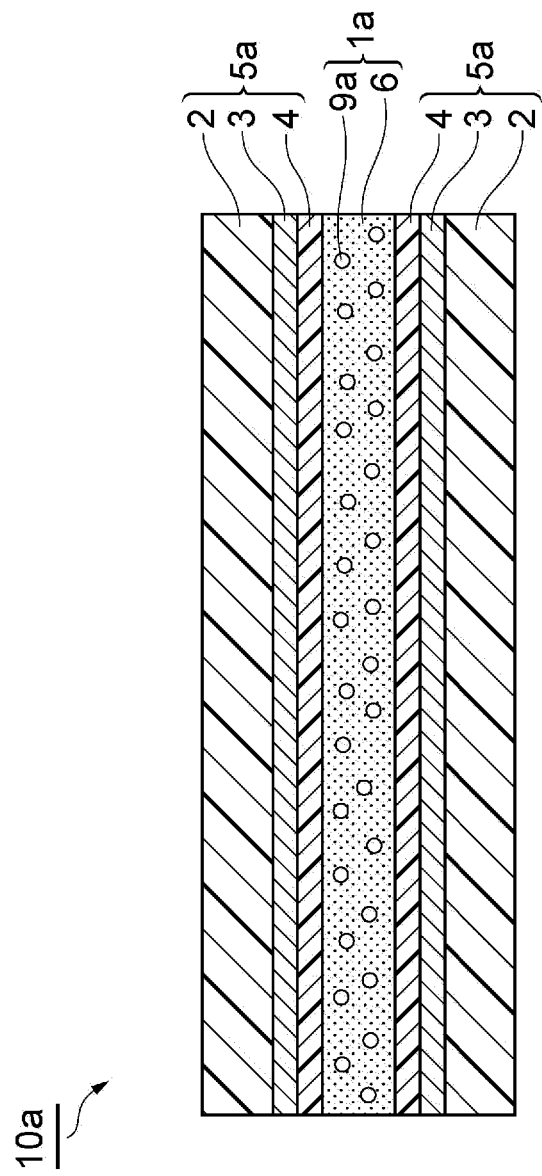
FIG. 1 is a schematic cross-sectional view illustrating a configuration of a wavelength conversion sheet according to an embodiment of the present invention.
Figure 2:
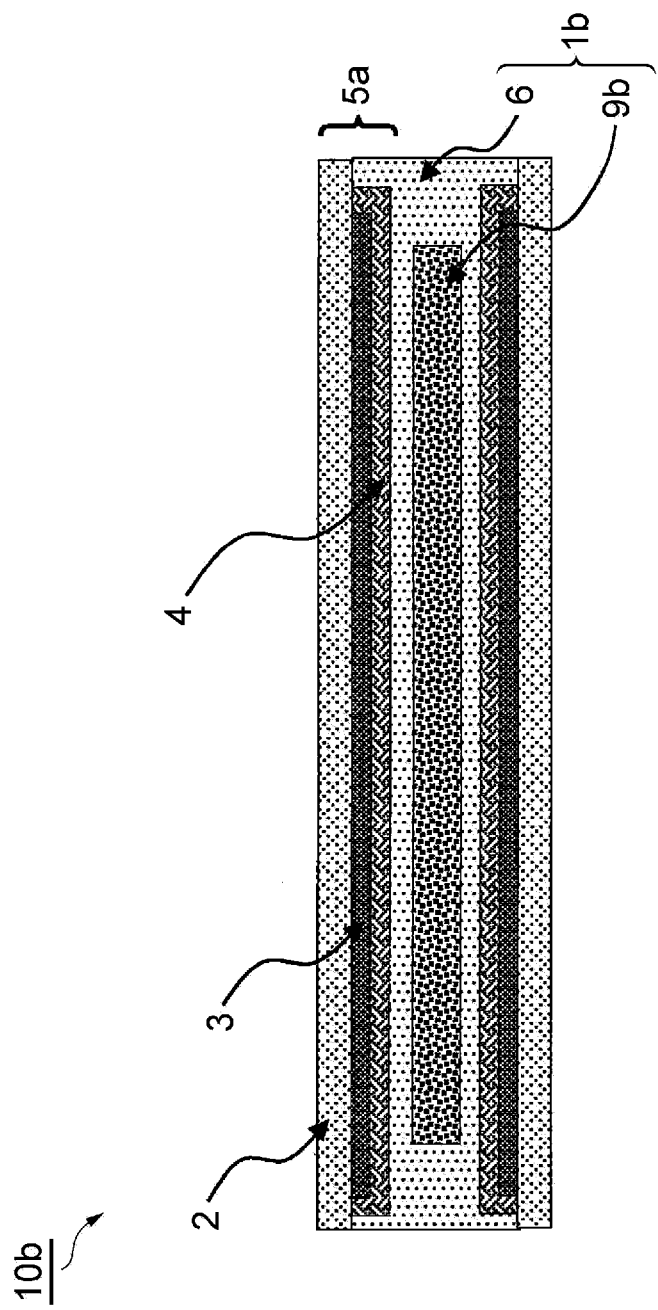
FIG. 2 is a schematic cross-sectional view illustrating a configuration of a wavelength conversion sheet according to another embodiment of the present invention.

Embodiments of the present invention will be described below. The embodiments described below are merely examples of the present invention. As a matter of course, the embodiments of the present invention can be appropriately modified without changing the spirit of the present invention.

FIGS. 1 to 7 are schematic cross-sectional views each illustrating a configuration of a wavelength conversion sheet according to an embodiment of the present invention. Wavelength conversion sheets 10a, 10b, 10c, 10d, 10e, 10f, and 10g (collectively referred to as wavelength conversion sheet 10) of the embodiments are configured by laminating a phosphor layer 1a or 1b (collectively referred to as phosphor layer 1) that uses quantum dots (phosphors) 9a and 9b (collectively referred to as phosphors 9), and barrier films 5a and 5b (collectively referred to as barrier film 5). The wavelength conversion sheet 10 may have a structure sandwiching the phosphor layer 1 between the barrier films 5 or between laminated films in each of which another plastic film 8 is laminated on the barrier film 5.

As the plastic film 8 to be laminated on the barrier film 5, a polyethylene terephthalate film or a polyethylene naphthalate film can be used. As the plastic film 8, a film having a thickness of 50 μm or less is desirably used to make the total thickness thinner. The plastic film 8 may be a lamination of a plurality of films. When the plastic film 8 is a polyethylene terephthalate film, the acid number is not limited and accordingly a polyethylene terephthalate film 2 with a barrier layer formed therein may be used or other polyethylene terephthalate may be used.

A coating layer may be further laminated onto the barrier film 5 or the plastic film 8 to exhibit an optical function or an antistatic function. Examples of the optical function include an interference fringe (moire) prevention function, an antireflection function, and a diffusion function. The coating layer may be a mat layer constituted containing, for example, a binder resin and microparticles.

As an adhesion material to be used for lamination of the barrier film 5 and the plastic film 8, an adhesive or a tackifier of acrylic materials, polyester materials, and the like may be used. The thickness of the adhesion material is desirably 10 μm or less to make the total thickness thinner.

The barrier film 5 is obtained by laminating a barrier layer on at least one surface of a polyethylene terephthalate film having an acid number (the number of mg of potassium hydroxide needed to neutralize free fatty acid and other acidic substances contained in 1 g of an oil or fat, or a wax) smaller than about 25 inclusive as a substrate. The barrier layer preferably includes an inorganic oxide thin film layer 3 and a gas barrier coating layer 4. More preferably, the inorganic oxide thin film layer 3 is laminated on at least one surface of the polyethylene terephthalate film 2, while the gas barrier coating layer 4 is laminated on the inorganic oxide thin film layer 3.

The polyethylene terephthalate film 2 in the barrier film 5 has an acid number smaller than about 25 inclusive, preferably smaller than 20 inclusive, and more preferably smaller than 17 inclusive. By permitting the acid number not to be excessively high, stability of the polyethylene terephthalate film tends to increase and the barrier properties tends not to be impaired in high-temperature and high-humidity environments. Examples of a method of reducing the acid number of the polyethylene terephthalate film 2 include a method in which polyethylene terephthalate is synthesized so as to have a high molecular weight to thereby decrease terminal carboxyl groups. The polyethylene terephthalate film preferably has an acid number greater than 1 inclusive.

For the inorganic oxide thin film layer 3, aluminum oxide, silicon oxide, magnesium oxide, or a mixture thereof is used. From the perspective of barrier properties and productivity, aluminum oxide or silicon oxide is desirably used. The inorganic oxide thin film layer 3 is preferably a vapor deposited film.

The inorganic oxide thin film layer 3 desirably has a thickness in a range of 10 to 500 nm in general. When the film thickness is excessively thin, a uniform film is not necessarily obtained, or the function as a gas barrier material is not necessarily sufficiently achieved. However, when the film thickness exceeds 500 nm, the thin film cannot retain flexibility and may have cracks after being formed, due to external factors, such as bending and pulling. More preferably, the inorganic oxide thin film layer 3 has a thickness in a range of 50 to 300 nm.

The gas barrier coating layer 4 is provided to prevent secondary damage in various ways in post-processing and also to give high barrier properties. The gas barrier coating layer 4 is formed by coating a coating agent that contains, for example, a water soluble polymer, and a solution or a water/alcohol mixture solution containing at least either (a) one or more metal alkoxides and hydrolysates or (b) tin chloride. The gas barrier coating layer 4 preferably contains, as a component, at least one selected from a group consisting of hydroxyl group-containing polymer compounds, metal alkoxides, metal alkoxide hydrolysates, and metal alkoxide polymeric materials. Examples of the water soluble polymer (or the hydroxyl group-containing polymer compound) used in the gas barrier coating layer 4 can include polyvinyl alcohol, polyvinyl pyrrolidone, and starch, but particularly when polyvinyl alcohol is used, the gas barrier coating layer 4 exhibits the best barrier properties. The gas barrier coating layer 4 preferably has a thickness in a range of 100 to 500 nm.

Tin chloride may be stannous chloride, stannic chloride, or a mixture thereof, or may be anhydrides or hydrates. The barrier film 5 may be a lamination of layers in which the inorganic oxide thin film layers 3 and the gas barrier coating layers 4 are alternately laminated (twice or more) on one surface of the polyethylene terephthalate film 2. Use of the barrier film 5 as mentioned above can ensure good performance of the phosphor layer 1 that uses the quantum dots. As a result, the obtained display is ensured to have a high efficiency, high resolution and long life.

A backlight unit according to an embodiment of the invention is configured by a light guide plate, an LED light source, and the wavelength conversion sheet 10. The LED light source is disposed on a side surface of the light guide plate. Inside the LED light source, a plurality of LED devices emitting blue light are provided. The LED devices may be violet LEDs, or may be LEDs with an even lower wavelength. The LED light source irradiates light towards a side surface of the light guide plate. In the case of a backlight unit using quantum dots, the irradiated light is incident on the phosphor layer 1 by way of the light guide plate, for example. Barrier properties have to be given to the phosphor layer 1. Therefore, desirably, it is so configured that a layer, that is a mixture of a resin, such as an acrylic or epoxy resin, and phosphors, is sandwiched between the barrier films 5 or between laminated films each including the barrier film 5.

The phosphor layer 1 is a thin film with a thickness of tens to hundreds of μm made of a resin or the like. For the resin, a photosensitive resin, for example, is used. In the resin, two kinds of phosphors composed of quantum dots are sealed in a mixed state. Alternatively, the phosphor layer 1 may be a lamination of two phosphor layers 1 in each of which only one kind of phosphors is sealed. For the phosphors, those which have the same excitation wavelength are selected. The excitation wavelength is selected on the basis of the wavelength of the light irradiated by the LED light source. The fluorescent colors of the two kinds of phosphors are different from each other. The fluorescent colors are red and green. The fluorescence wavelengths and the wavelength of the light irradiated by the LED light source are selected on the basis of spectroscopic properties of the color filter. The fluorescence peak wavelengths are, for example, 610 nm for red and 550 nm for green.

The particle structure of the phosphors will now be described. Each phosphor has a core as a light emitting portion coated with a shell as a protective film. For example, cadmium selenide (CdSe) can be used for the core and zinc sulfide (ZnS) for the shell. By covering surface defects of the CdSe particles with ZnS having a large band gap, the quantum yield is improved. The phosphor may have a core doubly coated with a first shell and a second shell. CdSe can be used for the core, zinc selenide (ZnSe) for the first shell, and ZnS for the second shell.

The phosphor layer 1 is laminated on the barrier film 5, for example, through the following procedure. The phosphors are mixed with a sealing resin. A liquid mixture, in which the phosphors are mixed with the sealing resin, is coated onto the barrier film 5. Examples of the sealing resin include photosensitive resins, thermosetting resins, and chemically curable resins. The sealing resin is (UV) cured by ultraviolet irradiation or heating, thereby forming the phosphor layer 1. As the sealing resin, a photosensitive resin may be combined with a thermosetting resin. In this case, the sealing resin is UV cured, followed by thermosetting, thereby forming the phosphor layer. As a result, the phosphor layer 1 of about 50 μm is formed on the barrier film 5.

Examples of the photosensitive resin include (meth)acrylate. Examples of the thermosetting resin include compounds having, for example, amino groups and epoxy groups.

When the plastic film 8 is not laminated on the barrier film 5, the phosphor layer 1 can be formed (laminated), as illustrated in FIGS. 1 to 4, on the barrier layer side of the barrier film 5. Further, when the phosphor layer 1 is sandwiched between the barrier films 5, the pair of barrier films 5 can be laminated such that the barrier layers will face each other via the phosphor layer 1. In other words, the pair of barrier films 5 can be laminated so as to sandwich the phosphor layer 1, with the barrier layers being opposed to the phosphor layer 1.

Figure 5:
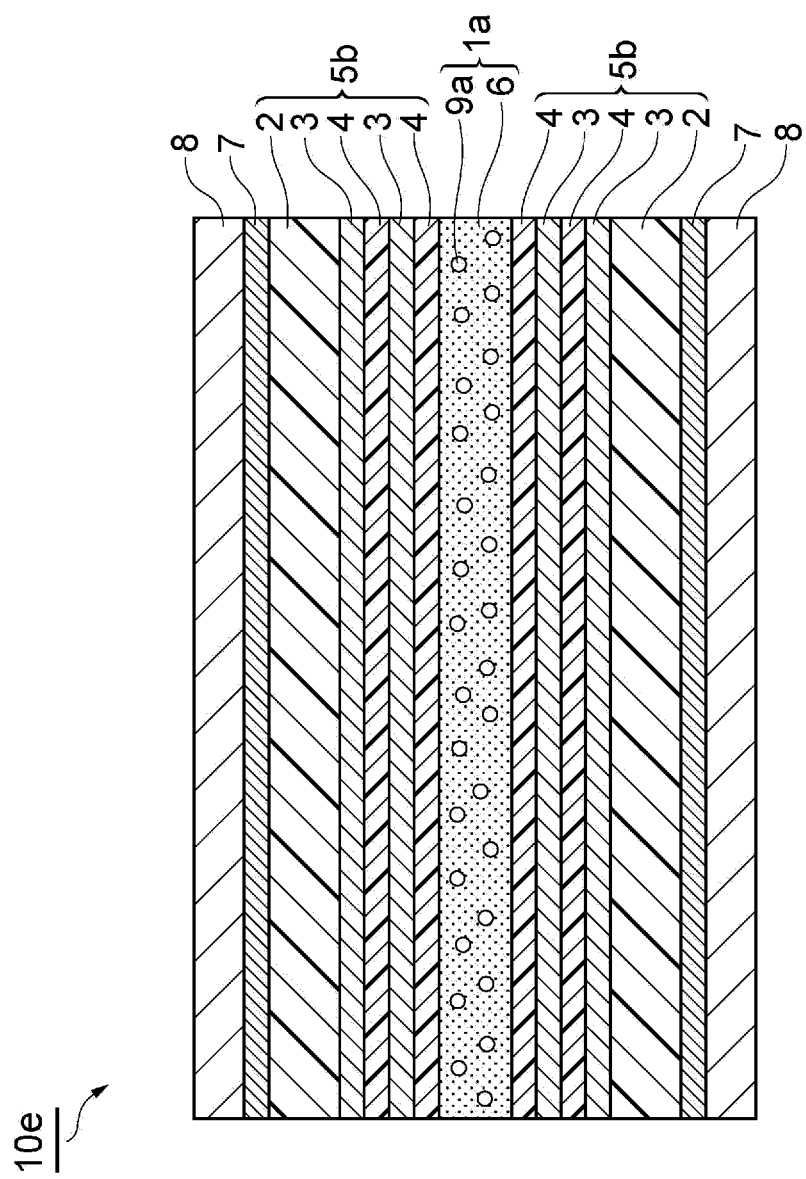
FIG. 5 is a schematic cross-sectional view illustrating a configuration of a wavelength conversion sheet according to another embodiment of the present invention.
Figure 6:
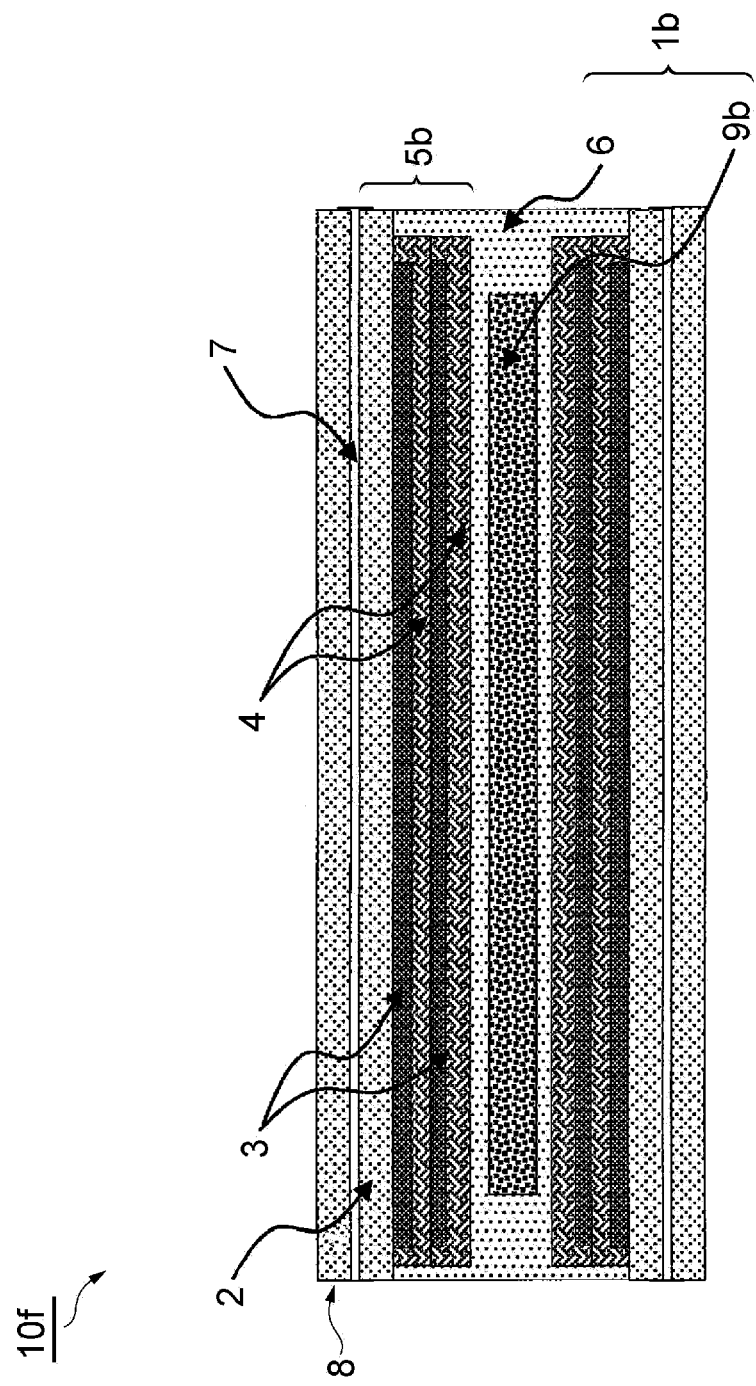
FIG. 6 is a schematic cross-sectional view illustrating a configuration of a wavelength conversion sheet according to another embodiment of the present invention.
Figure 7:
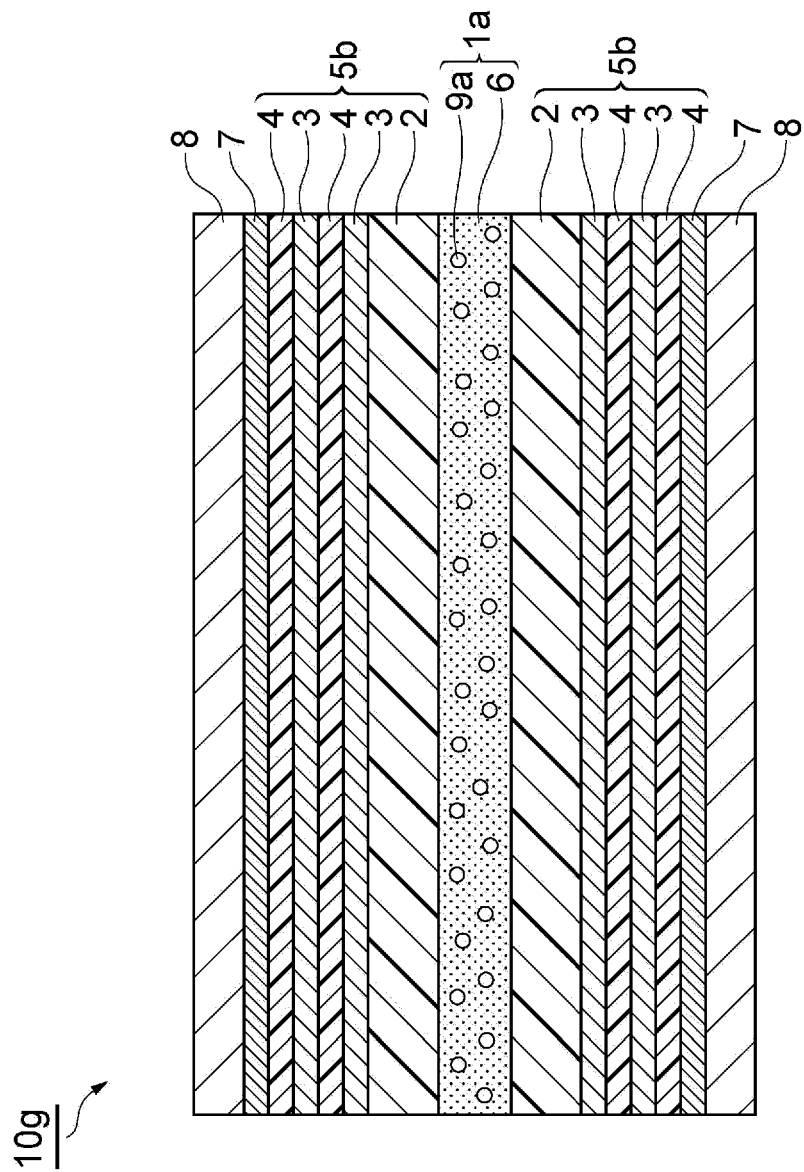
FIG. 7 is a schematic cross-sectional view illustrating a configuration of a wavelength conversion sheet according to another embodiment of the present invention.

In contrast, when the plastic film 8 is laminated on each barrier film 5, the phosphor layer 1 may be formed (laminated), as illustrated in FIGS. 5 and 6, on the barrier layer side of the barrier film 5, or may be formed (laminated), as illustrated in FIG. 7, on the polyethylene terephthalate film 2 side of the barrier film 5. Further, when the phosphor layer 1 is sandwiched between the barrier films 5, the pair of barrier films 5 can be laminated such that the barrier layers (or the polyethylene terephthalate films 2) face each other via the phosphor layer 1. In other words, the pair of barrier films 5 may be laminated so as to sandwich the phosphor layer 1, with the barrier layers (or the polyethylene terephthalate films 2) being opposed to the phosphor layer 1. Thus, the plastic film 8 can be laminated outside the laminate of the barrier films 5 and the phosphor layer 1, that is, can be laminated on the polyethylene terephthalate film 2 shown in FIGS. 5 and 6 (or the barrier layer shown in FIG. 7). When the wavelength conversion sheet 10 has the configuration shown in FIG. 7, that is, when each polyethylene terephthalate film 2 having an acid number smaller than about 25 inclusive is arranged on the phosphor layer side, heating for drying or curing in the process of forming the phosphor layer 1 does not cause degradation of the polyethylene terephthalate film 2 as a substrate but tends to easily maintain the barrier properties.

EXAMPLES

Example 1

A polyethylene terephthalate film 2 (acid number: 25, thickness: 25 μm) was prepared so as to have an acid number smaller than 25 inclusive. On one surface of the polyethylene terephthalate film 2 thus prepared, silicon oxide was provided as an inorganic oxide thin film layer 3 by vapor deposition so as to have a thickness of 250 Å, followed by wet-coating a coating liquid that contained alkoxysilane and polyvinyl alcohol, as a gas barrier coating layer 4. Thus, by sequentially laminating the above layers, a barrier film 5a having a gas barrier coating layer with a thickness of 0.3 μm was obtained. Two barrier films 5a were prepared in this way.

Phosphors each having a core/shell structure of CdSe/ZnS were obtained by the following method. Firstly, a solution in which octylamine and cadmium acetate were added to octadecene was mixed with a solution in which selenium was dissolved in trioctylphosphine, at a mass ratio of 1:1. The mixed solution was passed through a heated microchannel to obtain a dispersion of CdSe microparticles as core microparticles.

Subsequently, a solution in which $[(CH_3)_2NCSS]_2Zn$ was dissolved in trioctylphosphine was mixed with the thus obtained CdSe microparticle dispersion at a mass ratio of 1:1. The liquid mixture was passed through a heated microchannel to obtain phosphors 9a (in a CdSe/ZnS structure) provided with the CdSe microparticles and a ZnS film coating the microparticles. The phosphors 9a thus obtained were subjected to density adjustment and then dispersed in a volatile solvent to obtain a phosphor dispersion. The phosphor dispersion was mixed with a photosensitive resin to obtain a resin composition, which was then coated onto a gas barrier coating layer 4 side surface of one of the previously prepared two barrier films 5a, thereby obtaining a phosphor layer 1a with a thickness of 50 μm.

The other of the previously prepared two barrier films 5a was laminated on the phosphor layer 1a in such a way that the phosphor layer 1a contacts the gas barrier coating layer 4, followed by UV curing lamination, thereby obtaining a wavelength conversion sheet 10a of Example 1.

FIG. 1 illustrates a configuration of the wavelength conversion sheet 10a of Example 1. In the wavelength conversion sheet 10a, the pair of barrier films 5a are laminated such that the barrier layers (gas barrier coating layers 4) face each other via the phosphor layer 1a. In each barrier film 5a, the inorganic oxide thin film layer 3 and the gas barrier coating layer 4 are provided on the polyethylene terephthalate film 2. The phosphor layer 1a is obtained by sealing the phosphors 9a with a UV curing resin.

The following sets forth a method of measuring an acid number. The polyethylene terephthalate film was cut for weighing 5.0 g and added to 100 mL of cresol, followed by sufficient heating to dissolve free components. The solution after cooling was subjected to titration with a 0.1 mol/L ethanol solution of potassium hydroxide and the amount (mL) of the ethanol solution of potassium hydroxide used for neutralization was determined to calculate the acid number (refer to JIS K 0070). As an indicator, a phenolphthalein solution was used.

Example 2

A wavelength conversion sheet 10c of Example 2 was obtained in a manner similar to that of Example 1, except that the inorganic oxide thin film layers 3 and the gas barrier coating layers 4 were alternately laminated twice.

Figure 3:
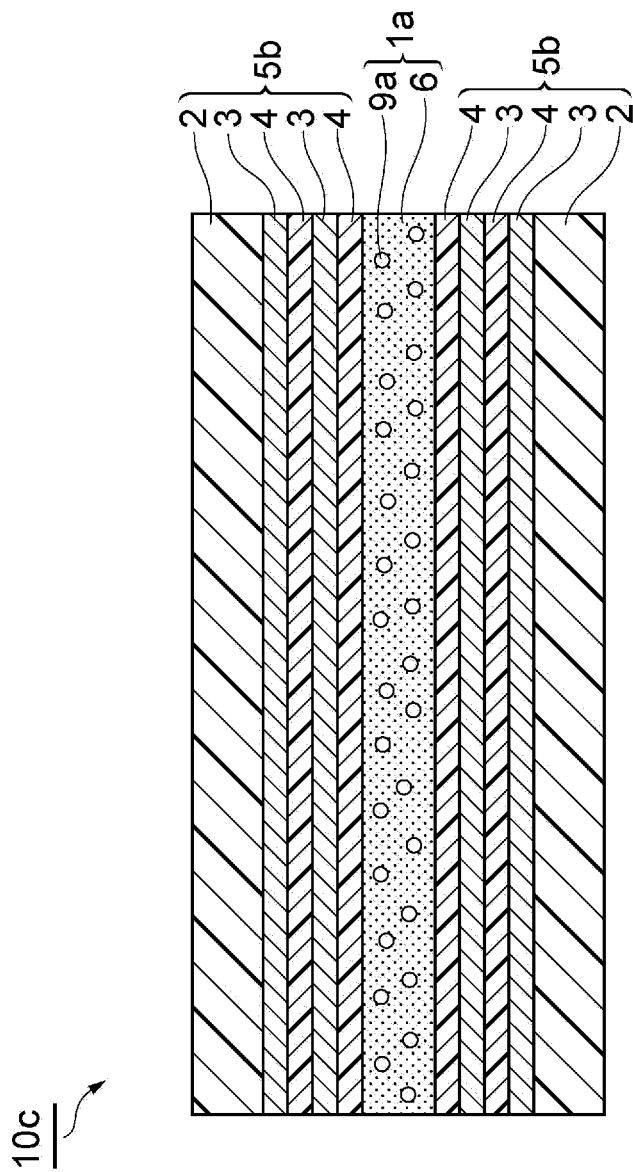
FIG. 3 is a schematic cross-sectional view illustrating a configuration of a wavelength conversion sheet according to another embodiment of the present invention.
Figure 4:
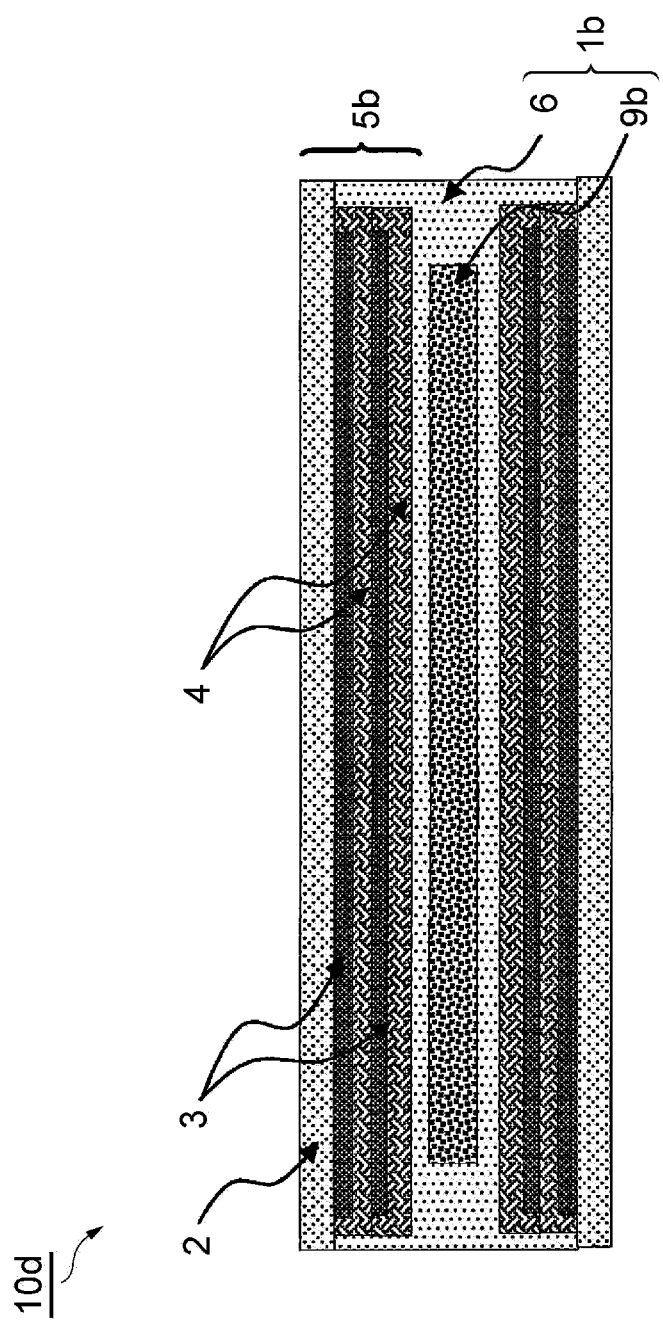
FIG. 4 is a schematic cross-sectional view illustrating a configuration of a wavelength conversion sheet according to another embodiment of the present invention.

FIG. 3 illustrates a configuration of the wavelength conversion sheet 10c using a barrier film 5b in which the inorganic oxide thin film layers 3 and the gas barrier coating layers 4 are alternately laminated twice.

Example 3

A polyethylene terephthalate film (acid number: 17, thickness: 25 μm) was prepared so as to have an acid number smaller than 25 inclusive. A wavelength conversion sheet 10c of Example 3 was obtained in a manner similar to that of Example 2, except that the polyethylene terephthalate film 2 (acid number: 17, thickness: 25 μm) was used instead of the polyethylene terephthalate film 2 (acid number: 25, thickness: 25 μm).

Example 4

A wavelength conversion sheet 10e of Example 4 was obtained in a manner similar to that of Example 2, except that a commercially available polyethylene terephthalate film (acid number: 34, thickness: 25 μm), as a plastic film 8, was adhered onto the barrier film 5b by means of an acrylic resin tackifier 7.

Example 5

A wavelength conversion sheet 10e of Example 5 was obtained in a manner similar to that of Example 3, except that a plastic film 8 was further adhered onto the barrier film 5b by means of the acrylic resin tackifier 7. The polyethylene terephthalate film (acid number: 17, thickness: 25 μm) obtained in Example 3 was used for the plastic film 8.

FIG. 5 illustrates a configuration of the wavelength conversion sheet 10e including the barrier films 5b in each of which the inorganic oxide thin film layers 3 and the gas barrier coating layers 4 are alternately laminated twice. In the wavelength conversion sheet 10e, the barrier films 5b are laminated onto the phosphor layer 1a such that the gas barrier coating layers 4 face each other, with the polyethylene terephthalate film, as the plastic film 8, being further adhered onto the polyethylene terephthalate film 2 of each barrier film 5b.

Example 6

A barrier film 5b was obtained in a manner similar to that of Example 2, with barrier layers (the inorganic oxide thin film layer 3 and the gas barrier coating layer 4) being formed on a surface, followed by further adhering a commercially available polyethylene terephthalate film (acid number: 34, thickness: 25 μm), as the plastic film 8, onto the barrier layers by means of the acrylic resin tackifier 7 to prepare a laminated film. Two such laminated films were prepared in the same way. Then, a phosphor layer 1a having a thickness of 50 μm was formed on a surface of the barrier film 5b of one of the prepared laminated films, where no barrier layer was formed, in the same manner as in Example 2.

Then, the other of the prepared two laminated films was laminated onto the phosphor layer 1a in such a way that the phosphor layer 1a contacts the polyethylene terephthalate film 2, followed by UV curing lamination, thereby obtaining a wavelength conversion sheet 10g of Example 6.

FIG. 7 illustrates a configuration of the wavelength conversion sheet 10g which includes the barrier films 5b in each of which the inorganic oxide thin film layers 3 and the gas barrier coating layers 4 are alternately laminated twice. In the wavelength conversion sheet 10g, the barrier films 5b and the phosphor layer 1a are laminated such that the polyethylene terephthalate films 2 face each other, with a polyethylene terephthalate film, as the plastic film 8, being further adhered onto the gas barrier coating layer 4 of each barrier film 5b.

Comparative Example 1

A wavelength conversion sheet of Comparative Example 1 was obtained in a manner similar to that of Example 1, except that a commercially available polyethylene terephthalate film (acid number: 34, thickness: 25 μm) was used instead of the polyethylene terephthalate film 2 (acid number: 25, thickness: 25 μm).

<Method of Evaluating Water Vapor Barrier Properties>

Evaluation samples, each of which had the same configuration as that of the barrier films used in Examples 1 to 3 and Comparative Example 1, were prepared. Further, evaluation samples, each of which had the same configuration as that of the barrier films (laminated films) adhered with plastic films used in Examples 4 and 5, were prepared. The water vapor barrier properties of the evaluation samples were evaluated by measuring water vapor permeability by a method based on the method of JIS K 7129 that uses an infrared sensor. For measurement of the water vapor permeability (g/m$^2$·day), a water vapor permeability measurement device (trade name: Permatran 3/31 manufactured by Modern Control Co., Ltd.) was used. The temperature in the permeation cell was 40° C., the relative humidity in the high humidity chamber was 90% RH, and the relative humidity in the low humidity chamber was 0% RH. The results of measuring the water vapor permeability are shown in Table 1.

<Evaluation of Backlight Unit>

Backlight units were prepared by combining the wavelength conversion sheets obtained in the examples and the comparative examples with an LED light source and a light guide plate. The backlight units thus prepared were stored at 60° C. and 90% RH for 1,000 hours to measure the initial and after-storage luminances using a luminance meter (trade name: LS-100 manufactured by Konica Minolta, Inc.). The results of measuring the luminance are shown in Table 1. A smaller time-course difference in luminance means that the barrier film has the better barrier properties. Comprehensive evaluations on the results of measuring the initial and after-storage luminances are also shown in Table 1.

"PET" in Table 1 denotes polyethylene terephthalate. From Table 1, it was found that the backlight units using the wavelength conversion sheets of Examples 1 to 5 maintained high luminance characteristic of a quantum dot display after the storage in the harsh environment.

In Comparative Example 1, a polyethylene terephthalate film having an acid number 34 was used for the barrier film. High luminance that should be characteristic of a backlight unit had been lost from the backlight unit in a short period. Therefore, the luminance after the storage for 1,000 hours was unmeasurable. Accordingly, it is found that the backlight unit of Comparative Example 1 is poor in reliability as a display.

INDUSTRIAL APPLICABILITY

Using the wavelength conversion sheet and the backlight unit of the present invention, an improved or even excellent high-resolution display having at least improved reliability can be manufactured.

DESCRIPTION OF REFERENCE SIGNS 1, 1a, 1b Phosphor Layer,
2 Polyethylene Terephthalate Film,
3 Inorganic Oxide Thin Film Layer,
4 Gas Barrier Coating Layer,
5, 5a, 5b Barrier Film,
6 Sealing Resin,
7 Acrylic Resin Tackifier,
8 Plastic Film,
9, 9a, 9b Phosphor,
10, 10a, 10b, 10c, 10d, 10e, 10f, 10g Wavelength Conversion Sheet

TABLE 1

| | Acid Number of Film 2 | Configuration of Barrier Layer | Plastic Film 8 (PET) | Water Vapor Permeability (g/m$^2$·day) | Luminance (cd/m$^2$) Initial | Luminance (cd/m$^2$) After-Storage | Evaluation |
|---|---|---|---|---|---|---|---|
| Example 1 | 25 | One layer of inorganic oxide thin film One layer of gas barrier coating | Not provided | $2 \times 10^{-2}$ | 90 | 83 | Good |
| Example 2 | 25 | Two layers of inorganic oxide thin film Two layers of gas barrier coating | Not provided | $8 \times 10^{-3}$ | 91 | 85 | Good |
| Example 3 | 17 | Two layers of inorganic oxide thin film Two layers of gas barrier coating | Not provided | $7 \times 10^{-3}$ | 91 | 87 | Excellent |
| Example 4 | 25 | Two layers of inorganic oxide thin film Two layers of gas barrier coating | Provided | $2 \times 10^{-3}$ | 90 | 86 | Good |
| Example 5 | 17 | Two layers of inorganic oxide thin film Two layers of gas barrier coating | Provided | $2 \times 10^{-3}$ | 90 | 89 | Excellent |
| Example 6 | 17 | Two layers of inorganic oxide thin film Two layers of gas barrier coating | Provided | $1 \times 10^{-3}$ | 90 | 89 | Excellent |
| Comp. Example 1 | 34 | One layer of inorganic oxide thin film One layer of gas barrier coating | Not provided | $9 \times 10^{-2}$ | 90 | Unmeasurable | Poor |

What is claimed is:

1. A wavelength conversion sheet comprising, a lamination of:
   a barrier film that comprises a barrier layer on one surface of a polyethylene terephthalate film, the polyethylene terephthalate film having an acid number smaller than about 25 inclusive; and,
   a phosphor layer that comprises quantum dots,
   wherein a plastic film is further adhered onto the barrier film by means of an acrylic resin tackifier.

2. The wavelength conversion sheet of claim 1, wherein the barrier layer includes an inorganic oxide thin film layer and a gas barrier coating layer.

3. The wavelength conversion sheet of claim 2, wherein the inorganic oxide thin film layer is composed of a vapor deposited film of silicon oxide or aluminum oxide.

4. The wavelength conversion sheet of claim 3, wherein the gas barrier coating layer contains at least one selected from a group consisting of hydroxyl group-containing polymer compounds, metal alkoxides, metal alkoxide hydrolysates, and metal alkoxide polymeric materials.

5. A backlight unit, comprising an LED light source, a light guide plate, and the wavelength conversion sheet of claim 4.

6. The wavelength conversion sheet of claim 3, wherein the inorganic oxide thin film layers and the gas barrier coating layers are alternately laminated twice or more on one surface of the polyethylene terephthalate film.

7. A backlight unit, comprising an LED light source, a light guide plate, and the wavelength conversion sheet of claim 3.

8. The wavelength conversion sheet of claim 2, wherein the gas barrier coating layer contains at least one selected from a group consisting of hydroxyl group-containing polymer compounds, metal alkoxides, metal alkoxide hydrolysates, and metal alkoxide polymeric materials.

9. The wavelength conversion sheet of claim 8, wherein the inorganic oxide thin film layers and the gas barrier coating layers are alternately laminated twice or more on one surface of the polyethylene terephthalate film.

10. A backlight unit, comprising an LED light source, a light guide plate, and the wavelength conversion sheet of claim 8.

11. The wavelength conversion sheet of claim 2, wherein the inorganic oxide thin film layers and the gas barrier coating layers are alternately laminated twice or more on one surface of the polyethylene terephthalate film.

12. A backlight unit, comprising an LED light source, a light guide plate, and the wavelength conversion sheet of claim 11.

13. A backlight unit, comprising an LED light source, a light guide plate, and the wavelength conversion sheet of claim 2.

14. A backlight unit, comprising an LED light source, a light guide plate, and the wavelength conversion sheet of claim 1.

* * * * *